(12) United States Patent
Sakai et al.

(10) Patent No.: US 6,245,257 B1
(45) Date of Patent: Jun. 12, 2001

(54) LIQUID CRYSTAL COMPOSITIONS

(75) Inventors: Yukari Sakai; Shinichi Nishiyama; Toyotaro Maruyama; Takahiro Fujiyama, all of Yokohama (JP)

(73) Assignee: Mitsui Chemicals INC, Tokyo (JP)

( * ) Notice: Subject to any disclaimer, the term of this patent is extended or adjusted under 35 U.S.C. 154(b) by 0 days.

(21) Appl. No.: 09/131,853

(22) Filed: Aug. 10, 1998

(30) Foreign Application Priority Data

Aug. 12, 1997 (JP) .................................................... 9-217587

(51) Int. Cl.⁷ .............................. C09K 19/32; C09K 19/52
(52) U.S. Cl. .................................. 252/299.62; 252/299.01
(58) Field of Search .......................................... 252/299.62

(56) References Cited

U.S. PATENT DOCUMENTS

| | | | |
|---|---|---|---|
| 5,246,622 | * 9/1993 | Shimizu et al. | 252/299.62 |
| 5,352,379 | * 10/1994 | Nishiyama et al. | 252/299.62 |
| 5,356,561 | * 10/1994 | Shimizu et al. | 252/299.62 |
| 5,725,798 | * 3/1998 | Tatsuki et al. | 252/299.62 |
| 5,776,365 | * 7/1998 | Tatsuki et al. | 252/299.62 |
| 5,888,420 | * 3/1999 | Sakai et al. | 252/299.01 |

FOREIGN PATENT DOCUMENTS

| | | |
|---|---|---|
| 0617109 | 9/1994 | (EP) . |
| 0811867 | 12/1997 | (EP) . |
| 0829526 | 3/1998 | (EP) . |
| WO96/38513 | 12/1996 | (WO) . |

* cited by examiner

*Primary Examiner*—C. H. Kelly

(57) ABSTRACT

The liquid crystal composition of the invention contains at least two compounds represented by the following formula (A) and each having different structures, one or more methylene group in the alkylene group $R_1$ may be substituted with —O— groups, not less than 50% by weight, and has a transmitted light quantity $I_{32}$ satisfying the condition of $0.5 \leq I_{32} \leq 0.50$,

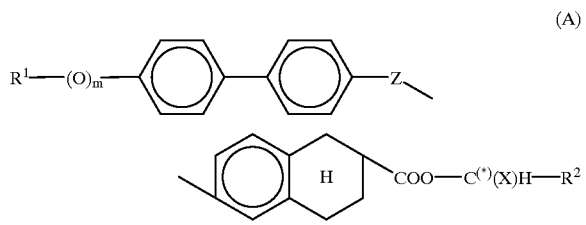

(A)

wherein $R^1$ is an alkyl group of 2 to 20 carbon atoms; m is 0 or 1; Z is a —COO— group or a —CH$_2$O— group; X is a hydrogen atom, a methyl group or a trifluoromethyl group; and $R^2$ is a group selected from the group consisting of a straight-chain alkyl group of 1 to 5 carbon atoms, an ether group represented by —(CH$_2$)$_p$—O—(CH$_2$)$_q$CH$_3$ and an alkene group wherein a terminal ethyl group consisting a straight-chain alkyl group of 2 to 5 carbon atoms is replaced with a group having a C=C double bond.

5 Claims, 2 Drawing Sheets

LIQUID CRYSTAL COMPOSITIONS

FIELD OF THE INVENTION

The present invention relates to liquid crystal compositions, and particularly to smectic liquid crystal compositions favorably used for an active element driving system. More particularly, the invention relates to "threshold value-free antiferroelectric liquid crystal compositions".

BACKGROUND OF THE INVENTION

Attempts to use liquid crystal elements utilizing electrooptic effect of twisted nematic (TN) liquid crystals (referred to as "TN liquid crystal elements" hereinafter) as display elements of animation display devices have been heretofore made.

The TN liquid crystal elements, however, have a long (slow) electrooptic response time of several tens milliseconds. Therefore, the display devices using the TN liquid crystal elements hardly follow animation of quick motions, even when the display devices are driven by the use of active elements. Further, the angle of field of an image displayed by the use of the TN liquid crystal element is narrow, and therefore when the image displayed by the use of the TN liquid crystal element is observed with an angle beyond the fixed angle of field, a problem of an image with reversed gradation or a problem of change in color tone of the image takes place.

On the other hand, display systems not using the nematic liquid crystals but using smectic liquid crystals having higher order than the nematic liquid crystals have been proposed. For example, there are a display system using a surface stabilized ferroelectric liquid crystal, which has been reported by Clark and Lagerwall (Appl. Phys. Lett. 36, 899 (1980)), and a display system using a liquid crystal of chiral smectic CA phase known as one of antiferroelectric phases, which has been proposed by Chandani, et al. (Jpn. J. Appl. Phys., 27, L1279, 1988). These display systems can be driven with an electrooptic response time shorter by two or three figures than that of the display systems using the nematic liquid crystals, and besides, a wide angle of field can be obtained in these systems.

In the former system, however, only binary display is theoretically possible and gradation display is generally difficult. In the latter system, though the gradation display is feasible, the threshold value voltage is generally high, so that it is difficult to drive the system by the use of common active elements such as TFT.

Differently from the above-mentioned systems, a display system using a smectic liquid crystal having an applied voltage-light transmittance relationship shown by a V-shaped hysteresis curve, namely, a display system using "thresholdless antiferroelectric liquid crystal", has been recently reported by Inui, et al. (the 21st Liquid Crystal Forum 2C04 (1995)) and Tanaka, et al. (the same forum, 2C18), and has been paid much attention. This system utilizes such a phenomenon that the directions of optic axes of the liquid crystal are uniformly changed when a voltage is applied to a liquid crystal cell wherein the liquid crystal is filled and so orientated that the smectic layer of the liquid crystal becomes perpendicular to the substrate. In this system, the voltage necessary for the response of the liquid crystal is extremely low. This system can be driven by a common active element such as TFT, and is proposed as a system capable of displaying intermediate tone (Fukuda, Asia Display '95 S6-1). Other than this liquid crystal, there is known, as a liquid crystal composition showing such properties as mentioned above, a liquid crystal composition containing a liquid crystal compound having a ferroelectric phase and an antiferroelectric phase in its phase series (referred to as an "antiferroelectric liquid crystal" hereinafter) in an amount of not less than 40% by weight and containing a liquid crystal compound having a ferroelectric phase but having no antiferroelectric phase in its phase series (referred to as a "ferroelectric liquid crystal" hereinafter), as described in Japanese Patent Laid-Open Publication No. 59624/1997. At present, however, there are very few useful thresholdless antiferroelectric liquid crystal compositions.

OBJECT OF THE INVENTION

It is an object of the present invention to provide a novel threshold value-free antiferroelectric liquid crystal composition.

It is another object of the invention to provide a liquid crystal composition which is suitable for performing voltage gradation display by a driving system using an active element such as TFT, has an applied voltage-light transmittance relationship shown by a V-shaped hysteresis curve, and can make a quick response.

SUMMARY OF THE INVENTION

The liquid crystal composition according to the present invention is a liquid crystal composition which contains at least two compounds represented by the following formula (A) and each having different structures in an amount of not less than 50% by weight based on the total amount of all liquid crystal compounds in the liquid crystal composition, and has a transmitted light quantity $I_{32}$ satisfying the following condition (II):

$$0.05 \leq I_{32} \leq 0.50 \tag{II}$$

said transmitted light quantity $I_{32}$ being determined by the method comprising arranging two transparent substrates, each of which has a transparent electrode and at least one of which has an orientation film, in such a manner that the transparent electrodes face each other with holding a gap having a width of 2 $\mu$m therebetween, to form a cell; filling the gap with the liquid crystal composition; orientating the liquid crystal composition; placing the cell between a polarizer and an analyzer in the crossed Nicols state so that the absorption axis of the polarizer agrees with the optical axis of the liquid crystal composition under application of no voltage; measuring light transmittance at the applied voltage to obtain a hysteresis curve showing an applied voltage-light transmittance relationship of the liquid crystal composition; and applying a voltage $V_{32}$ represented by the following formula (I) to the cell filled with the liquid crystal composition to measure the transmitted light quantity $I_{32}$;

$$V_{32} = 0.40 \times V_{80} \tag{I}$$

wherein $V_{80}$ is an applied voltage at which the transmitted light quantity of the liquid crystal composition becomes 0.8 in the hysteresis curve in which the transmitted light quantity given when no voltage is applied is 0 and the maximum transmitted light quantity is 1;

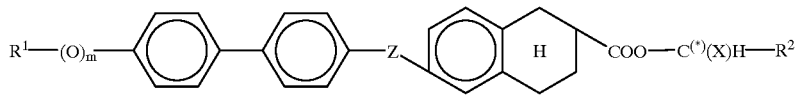

[A]

wherein $R^1$ is an alkyl group of 2 to 20 carbon atoms, in which at least a part of hydrogen atoms may be substituted with halogen atoms, at least a part of methylene groups and/or halomethylene groups may be substituted with —O— groups, with the proviso that, when a part of the methylene groups and/or the halomethylene groups are substituted with —O— groups, the plural —O— groups are not adjacent to each other;

m is 0 or 1;

Z is a —COO— group or a —CH$_2$O— group;

X is a hydrogen atom, a methyl group or a trifluoromethyl group; and $R^2$ is a group selected from the group consisting of a straight-chain alkyl group of 1 to 5 carbon atoms, an ether group represented by —(CH$_2$)$_p$—O—(CH$_2$)$_q$CH$_3$ (p is an integer of 1 to 6, and q is 0 or an integer of 1 to 3) and an alkene group wherein a terminal ethyl group constituting a straight-chain alkyl group of 2 to 5 carbon atoms is replaced with a group having a C=C double bond.

In the liquid crystal composition of the invention, a compound (A-1) represented by the following formula (A-1) and a compound (A-2) represented by the following formula (A-2) are not present together; a compound (A-3) represented by the following formula (A-3) and a compound (A-7) represented by the following formula (A-7) are not present together; a compound (A-4) represented by the following formula (A-4), a compound (A-5) represented by the following formula (A-5) and a compound (A-6) represented by the following formula (A-6) are not present together; and a compound (A-7) represented by the following formula (A-7) and a compound (A-8) represented by the following formula (A-8) are not present together.

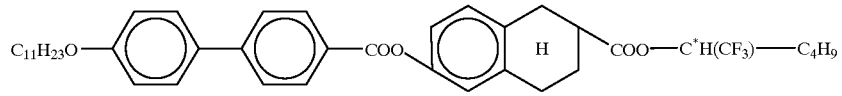

[A-1]

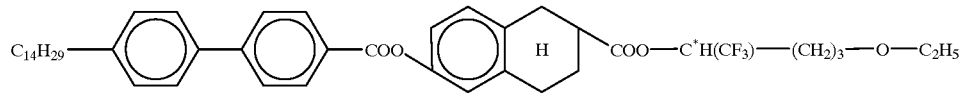

[A-2]

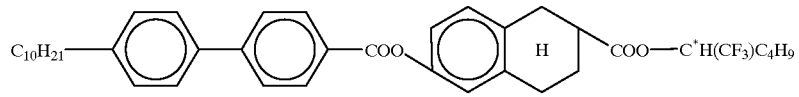

[A-3]

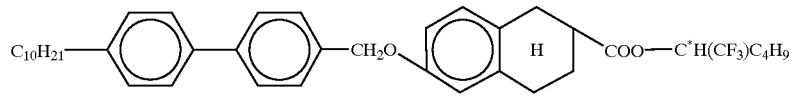

[A-4]

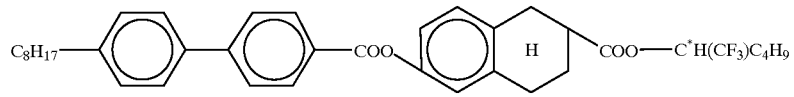

[A-5]

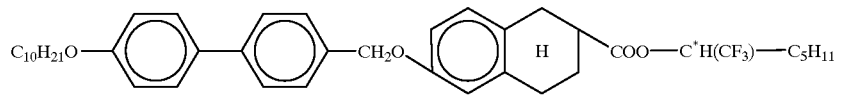

[A-6]

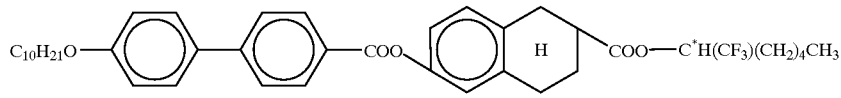

[A-7]

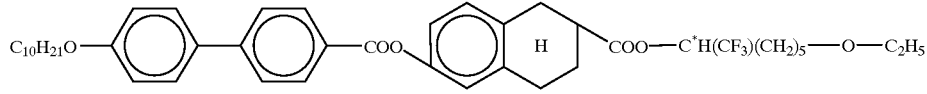

[A-8]

When a hysteresis curve showing an applied voltage-light transmittance relationship of the liquid crystal composition of the invention is formed, the hysteresis curve is a substantially V-shaped curve having, as its bottom point, an intersection point in the vicinity of an applied voltage of 0 V. Therefore, the liquid crystal composition of the invention can be used as a smectic liquid crystal composition suitable for the active element driving. The liquid crystal composition of the invention is a "thresholdless antiferroelectric liquid crystal composition".

DETAILED DESCRIPTION OF THE INVENTION

Figure 1:
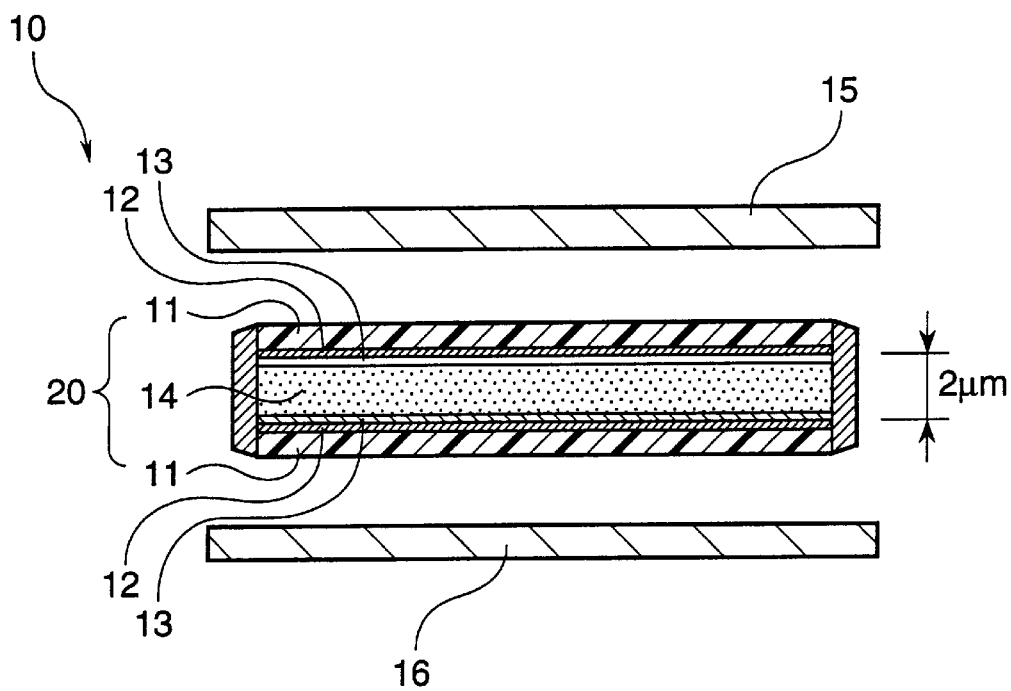
FIG. 1 is a sectional view of a liquid crystal element used for examining an applied voltage-light transmittance relationship.

The liquid crystal composition according to the present invention is described in detail hereinafter.

The liquid crystal composition of the invention contains at least two kinds of compounds which are represented by the following formula (A) and each have different structures.

[A]

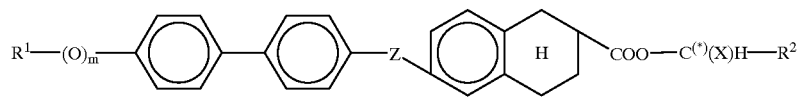

In the formula (A), $R^1$ is an alkyl group of 2 to 20 carbon atoms. At least a part of hydrogen atoms in the alkyl group may be substituted with halogen atoms. At least a part of methylene groups and/or halomethylene groups in the alkyl group may be substituted with —O— groups. When a part of the methylene groups and/or the halomethylene groups in the alkyl group are substituted with —O— groups, the plural —O— groups are not adjacent to each other. That is, any —O—O— bond is not present in the compounds represented by the formula (A).

Examples of the groups indicated by $R^1$ are described in Table 1.

TABLE 1

| Examples of $R^1$ | |
|---|---|
| $C_8H_{17}$— | $CH_3$—O—$(CH_2)_8$— |
| $C_9H_{19}$— | $CH_3$—O—$(CH_2)_9$— |
| $C_{10}H_{21}$— | $CH_3$—O—$(CH_2)_{10}$— |
| $C_{11}H_{23}$— | $CH_3$—O—$(CH_2)_{11}$— |
| $C_{12}H_{25}$— | $CH_3$—O—$(CH_2)_{12}$— |
| $C_{13}H_{27}$— | $C_8F_{17}$— |
| $C_{14}H_{29}$— | |

In the formula (A), m is 0 or 1;

Z is a —COO— group or a —$CH_2O$— group;

X is a hydrogen atom, a methyl group or a trifluoromethyl group; and $R^2$ is a group selected from the group consisting of a straight-chain alkyl group of 5 or less carbon atoms, an ether group represented by —$(CH_2)_p$—O—$(CH_2)_q CH_3$ (p is an integer of 1 to 6, and q is 0 or an integer of 1 to 3) and an alkene group wherein a terminal ethyl group in a straight-chain alkyl group of 2 to 5 carbon atoms is replaced with a group having a C=C double bond.

Examples of the groups indicated by $R^2$ are described in Table 2.

TABLE 2

| Examples of $R^2$ | |
|---|---|
| —$(CH_2)_2$—O—$CH_3$ | —$CH_2$—(CH)=$(CH_2)$ |
| —$(CH_2)_2$—O—$C_2H_5$ | —$(CH_2)_2$—(CH)=$(CH_2)$ |
| —$(CH_2)_3$—O—$CH_3$ | —$(CH_2)_3$—(CH)=$(CH_2)$ |
| —$(CH_2)_3$—O—$C_2H_5$ | —$C_2H_5$ |
| —$(CH_2)_4$—O—$CH_3$ | —$(CH_2)_2CH_3$ |

TABLE 2-continued

Examples of $R^2$

| | |
|---|---|
| —$(CH_2)_4$—O—$C_2H_5$ | —$(CH_2)_3CH_3$ |
| —$(CH_2)_5$—O—$CH_3$ | —$(CH_2)_4CH_3$ |
| —$(CH_2)_5$—O—$C_2H_5$ | |

The liquid crystal composition of the invention contains at least two compounds represented by the formula (A) and each having different structures, as described above.

At least one compound selected from among the compounds of the formula (A) used in combination in the invention is preferably a liquid crystal compound wherein $R^2$ is not a straight-chain alkyl group.

That is, $R^2$ constituting at least one liquid crystal compound is preferably either an ether group represented by —$(CH_2)_p$—O—$(CH_2)_q CH_3$ (p is an integer of 1 to 6, and q is 0 or an integer of 1 to 3) or an alkene group wherein a terminal ethyl group in a straight-chain alkyl group is replaced with a group having a C=C double bond.

The compounds of the formula (A) preferably include a compound where $R^2$ is an alkyl group of 4 to 5 carbon atoms in the amount of not more than 30% by weight based on 100% by weight of the liquid crystal composition. When such a compound is included in the above amount, a low-voltage drive and quick response are achieved.

It is preferable that:

at least one compound selected from among the two or more compounds of the formula (A) forming the liquid crystal composition of the invention is a compound wherein $R^2$ in the formula (A) is an ether group represented by —$(CH_2)_p$—O—$(CH_2)_q CH_3$ (p is 3 or 5, and q is 0 or an integer of 1 to 5); and at least one compound selected from among other compounds than the above compound is any compound selected from the group consisting of a compound wherein $R_2$ in the formula (A) is an ether group represented by —$(CH_2)_p$—O—$(CH_2)_q CH_3$ (p is 2, 3 or 5, and q is 0 or 1), a compound wherein $R^2$ in the formula (A) is an alkyl group of 2 to 5 carbon atoms and X is a hydrogen atom or a straight-chain alkyl group of 1 to 5 carbon atoms, and a compound wherein $R^2$ in the formula (A) is a group represented by —$(CH_2)_a$—CH=$CH_2$ (a is 1, 2 or 3).

In at least one compound selected from among the two or more compounds of the formula (A) forming the liquid crystal composition of the invention, X in the formula (A) is a fluoroalkyl group; and in at least one compound selected from among other compounds than the above compound, X in the formula (A) is a hydrogen atom, an alkyl group or a fluoroalkyl group. If $R^2$ in the formula (A) representing the other compounds than the above compound is an alkyl group of 1 to 5 carbon atoms, X in this compound is preferably a hydrogen atom or an alkyl group.

Examples of combinations of the compounds represented by the following formula (A) and each having different structures are described in Table 3.

[A]

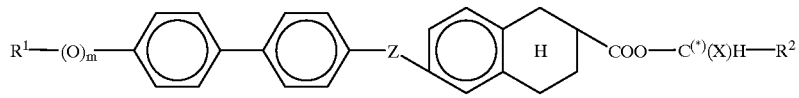

TABLE 3

Examples of Combination of Compounds of Formula [A]

| First component | | | | | Second component | | | | |
|---|---|---|---|---|---|---|---|---|---|
| $R^1$— | m | —Z— | —X | —$R^2$ | $R^1$— | m | —Z— | —X | —$R^2$ |
| $C_{11}H_{23}$ | 0 | COO | $CF_3$ | $(CH_2)_2CH=CH_2$ | $C_{10}H_{21}$ | 1 | COO | $CF_3$ | $(CH_2)_3OC_2H_5$ |
| $C_{12}H_{25}$ | 0 | COO | $CF_3$ | $(CH_2)_3OC_2H_5$ | $C_{10}H_{21}$ | 1 | COO | H | $C_4H_9$ |
| $C_{14}H_{29}$ | 0 | COO | $CF_3$ | $(CH_2)_3OC_2H_5$ | $C_{10}H_{21}$ | 1 | COO | $CH_3$ | $C_2H_5$ |
| $C_{10}H_{21}$ | 1 | COO | $CF_3$ | $(CH_2)_3OC_2H_5$ | $CH_3O(CH_2)_8$ | 1 | COO | $CF_3$ | $(CH_2)_3OC_2H_5$ |
| $C_{10}H_{21}$ | 1 | COO | $CF_3$ | $(CH_2)_3OC_2H_5$ | $C_{10}H_{21}$ | 1 | COO | $CF_3$ | $(CH_2)_5OC_2H_5$ |
| $C_{10}H_{21}$ | 1 | $CH_2O$ | $CF_3$ | $(CH_2)_3OC_2H_5$ | $C_{11}H_{23}$ | 0 | $CH_2O$ | $CF_3$ | $(CH_2)_2CH=CH_2$ |
| $C_{10}H_{21}$ | 1 | $CH_2O$ | $CF_3$ | $(CH_2)_3OC_2H_5$ | $C_{11}H_{23}$ | 0 | $CH_2O$ | $CF_3$ | $(CH_2)_2OCH_3$ |
| $C_{10}H_{21}$ | 0 | $CH_2O$ | $CF_3$ | $(CH_2)_5OC_2H_5$ | $C_{10}H_{21}$ | 0 | $CH_2O$ | $CF_3$ | $(CH_2)_2CH=CH_2$ |

In the liquid crystal composition of the invention, the compounds represented by the formula (A) and each having different structures need to be contained in an amount of not less than 50% by weight based on 100% by weight of the total of all liquid crystal components in the liquid crystal composition. It is preferable that they are contained in an amount of 55 to 100% by weight, and it is particularly preferable that they are contained in an amount of 65 to 100% by weight. The liquid crystal composition of the invention containing the liquid crystal compounds of the formula (A) in the above-mentioned amount is a smectic liquid crystal composition and is particularly suitable for an active element driving system.

The liquid crystal compounds represented by the formula (A) include those exhibiting ferroelectricity, those exhibiting antiferroelectricity and those exhibiting neither ferroelectricity nor antiferroelectricity. In the present invention, any of those compounds are employable. However, it is preferable that at least one compound selected from among the plural compounds of the formula (A) is a liquid crystal compound exhibiting ferroelectricity or antiferroelectricity, and it is particularly preferable that at least one compound selected from among the plural compounds of the formula (A) is a liquid crystal compound exhibiting antiferroelectricity. Such a liquid crystal compound can be favorably used as a threshold value-free antiferroelectric liquid crystal compound.

In the liquid crystal composition of the invention, a liquid crystal compound other than the liquid crystal compounds represented by the formula (A) is sometimes contained. In this case, if the liquid crystal compound other than the liquid crystal compounds represented by the formula (A) exhibits either ferroelectricity or antiferroelectricity, the plural liquid crystal compounds represented by the formula (A) may be those exhibiting neither ferroelectricity nor antiferroelectricity.

In the liquid crystal composition of the invention, a liquid crystal compound other than the liquid crystal compounds represented by the formula (A) may be contained, as described above.

Examples of the liquid crystal compounds other than those represented by the formula (A), which can form the liquid crystal composition of the invention together with the plural liquid crystal compounds represented by the formula (A), are given below.

Figure 2:
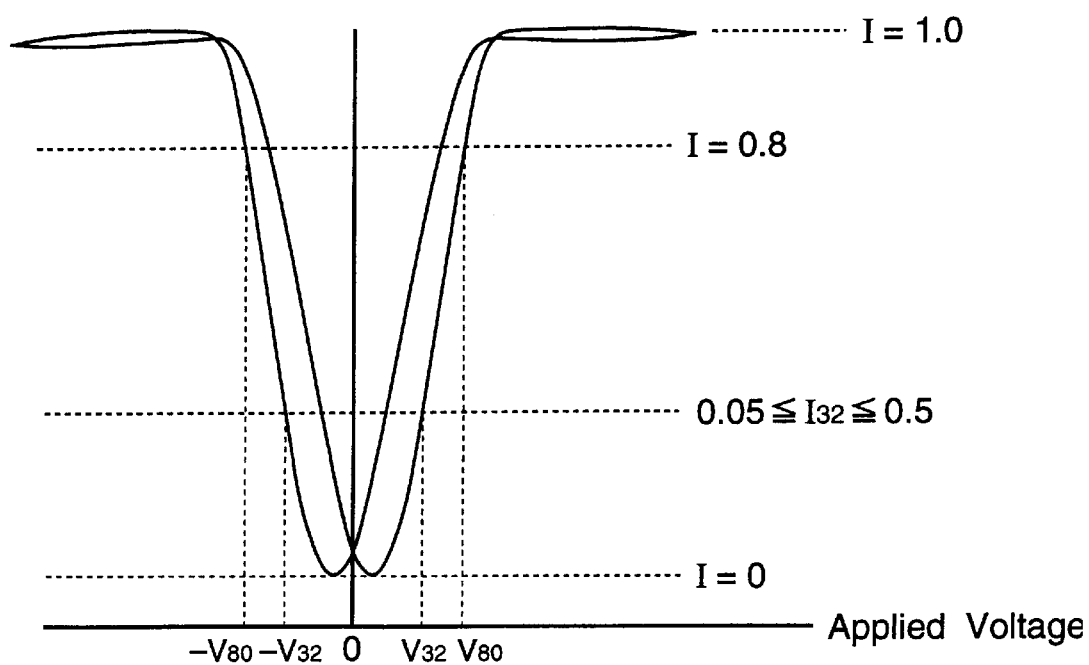
FIG. 2 is a view to explain properties of the liquid crystal composition of the present invention.

10. When a voltage is applied to the liquid crystal-containing cell 20 of the liquid crystal element 10 to measure a light transmittance corresponding to the applied voltage, a hysteresis curve showing an applied voltage-light transmittance relationship is formed. This hysteresis curve is substantially V-shaped, as shown in FIG. 2.

That is, when a voltage $V_{32}$ represented by the following formula (I) is applied to the liquid crystal-containing cell, the transmitted light quantity $I_{32}$ of the liquid crystal composition of the invention satisfies the condition (II) of $0.05 \leq I_{32} \leq 0.50$;

$$V_{32} = 0.40 \times V_{80} \quad (I)$$

wherein $V_{80}$ is an applied voltage at which the transmitted light quantity becomes 0.8 in the hysteresis curve in which the transmitted light quantity given when no voltage is applied is 0 and the maximum transmitted light quantity is 1.

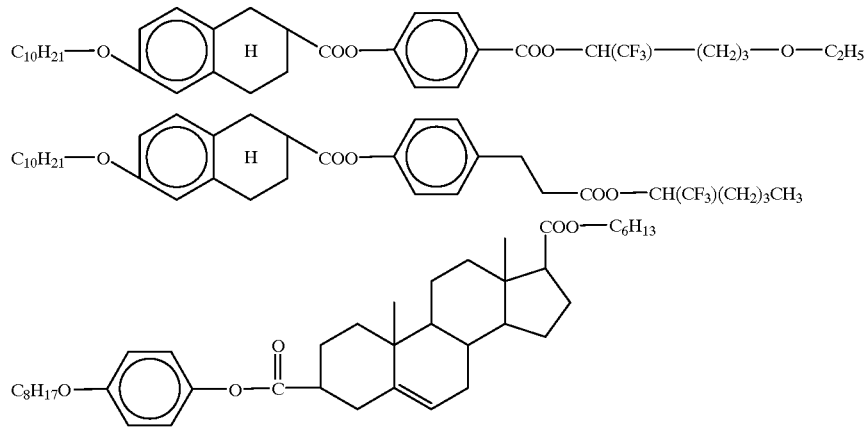

The other liquid crystal compounds (liquid crystal compounds other than those represented by the formula (A)) can be used singly or in combination.

In the liquid crystal composition, the other liquid crystal compounds are contained in an amount of usually less than 50% by weight, preferably 0 to 45% by weight, particularly preferably 0 to 35% by weight. The total amount of all of the liquid crystal compounds constituting the liquid crystal composition of the invention is 100% by weight.

To the liquid crystal composition of the invention, additives which can be added to common liquid crystal compositions, such as spacer particles, deterioration inhibitors and dyes, may be added.

Using the liquid crystal composition of the invention, a liquid crystal element is prepared by, for example, the following process. As shown in FIG. 1, two transparent substrates 11, each of which has a transparent electrode 12 and further has an orientation film 13 provided on the transparent electrode 12, are arranged in such a manner that the transparent electrodes 12 face each other with holding therebetween a gap having a width of 2 μm. Then, the gap formed between the transparent electrodes is filled with the liquid crystal composition 14 of the invention, and the liquid crystal composition 14 is orientated so that the direction of the optic axis of the liquid crystal composition 14 is changed correspondingly to the voltage applied between the transparent electrodes 12, to form a liquid crystal-containing cell 20. The liquid crystal-containing cell 20 is placed between a polarizer and an analyzer in the crossed Nicols state in such a manner that the absorption axis of the polarizer agrees with the optic axis of the liquid crystal composition under application of no voltage, to prepare a liquid crystal element The light transmittance of the liquid crystal composition of the invention at each voltage is measured in, for example, the above-mentioned manner, and the light transmittance when no voltage is applied is taken as 0 and the maximum light transmittance is taken as 1, as shown in FIG. 2. Then, the applied voltage is changed to measure a voltage ($V_{80}$) at which the light transmittance becomes 0.8 based on the maximum transmitted light quantity being 1. The obtained voltage ($V_{80}$), at which the transmitted light quantity becomes 0.8, is multiplied by 0.4 to obtain a measuring voltage ($V_{32}$) (i.e., voltage for measuring $I_{32}$). The transmitted light quantity ($I_{32}$) of the liquid crystal composition of the invention, that is given when the measuring voltage ($V_{32}$) is applied, satisfies the condition of $0.05 \leq I_{32} \leq 0.50$, preferably $0.15 \leq I_{32} \leq 0.50$, based on the maximum transmitted light quantity being 1.

The liquid crystal composition of the invention wherein the liquid crystal compounds represented by the formula (A) and each having different structures are contained so that the aforesaid applied voltage-light transmittance relationship is obtained is particularly suitable as a smectic liquid crystal composition for the active element driving system. The liquid crystal composition having such applied voltage-light transmittance relationship is favorably used as a threshold value-free antiferroelectric liquid crystal composition.

A liquid crystal composition containing not less than 40% by weight of an antiferroelectric liquid crystal is described in Japanese Patent Laid-Open Publications No. 59624/1997 and No. 048970/1997. According to the present invention, even without using such a large amount of antiferroelectric liquid crystal compound, there can be obtained a liquid crystal composition having an applied voltage-light transmittance relationship shown by a V-shaped hysteresis curve which is formed by applying a voltage to a cell, in which the smectic layer of the composition of the invention is oriented perpendicular to the substrate and thereby uniformly changing the optic axes of the liquid crystal.

In the liquid crystal element using the liquid crystal composition of the invention, the width of the gap filled with the liquid crystal composition is not limited to 2 μm, and the width can be set within the range of 1 to 6 μm.

EFFECT OF THE INVENTION

The liquid crystal composition of the invention has an applied voltage-light transmittance relationship shown by a V-shaped hysteresis curve, which is suitable for performing voltage gradation display by an active element driving system such as a TFT driving system. The liquid crystal composition having such an applied voltage-light transmittance relationship can make a quick response.

EXAMPLE

The present invention is further described with reference to the following examples, but it should be construed that the invention is in no way limited to those examples.

In each example, a liquid crystal cell prepared by the following process was used.

Preparation of Liquid Crystal Cell

As shown in FIG. 1, on each of a pair of glass substrates 11, an ITO transparent electrode 12 (sheet resistance: 30 Ω/cm$^2$) was formed, and on the electrode 12, a polyimide film 13 (film thickness: 30 nm) was further formed. The surface of the polyimide film 13 was rubbed with a nylon buffing material. Then, the pair of glass substrates 11 provided with the transparent electrode 12 and the polyimide orientation film 13 were arranged in such a manner that the polyimide orientation films 13 faced each other, with holding a spherical silica spacer (diameter: 2 μm) therebetween, and the peripheries except an injection opening for the liquid crystal were sealed with an epoxy adhesive. In the arrangement of the pair of glass substrates 11, the substrates were placed according to the Japanese Patent Application No. 7734/1995 (Japanese Patent Laid-Open Publication 62604/1996) so that the rubbing directions of the polyimide films on the two substrates were different from each other by 10°.

2 were mixed in a mixing ratio shown in the following table to prepare a liquid crystal composition 1. The liquid crystal composition 1 was injected into the liquid crystal cell having the above structure, and the injection opening was sealed with an epoxy adhesive.

Liquid crystal composition 1

| | Content | R$^1$ | m | Z | X | R$^2$ |
|---|---|---|---|---|---|---|
| Compound 1 | 25 wt % | C$_{11}$H$_{23}$— | 0 | —COO— | —CF$_3$ | —(CH$_2$)$_2$—CH=CH$_2$ |
| Compound 2 | 75 wt % | C$_{10}$H$_{21}$— | 1 | —COO— | —CF$_3$ | —(CH$_2$)$_3$—O—C$_2$H$_5$ |

Then, a rectangular wave of ±15 V and 60 Hz was applied between the transparent electrodes of the liquid crystal cell. Thereafter, the voltage was temporarily set at 0 V, and the cell was arranged between a polarizer and a analyzer in the crossed Nicols state in such a manner that the optic axis of the liquid crystal cell under application of no voltage would agree with the absorption axis of the polarizer. The surrounding temperature of the cell was set at 30° C. Then, a triangular wave of ±15 V and 100 mHz was applied between the transparent electrodes to measure a transmitted light intensity at each voltage.

Figure 3:
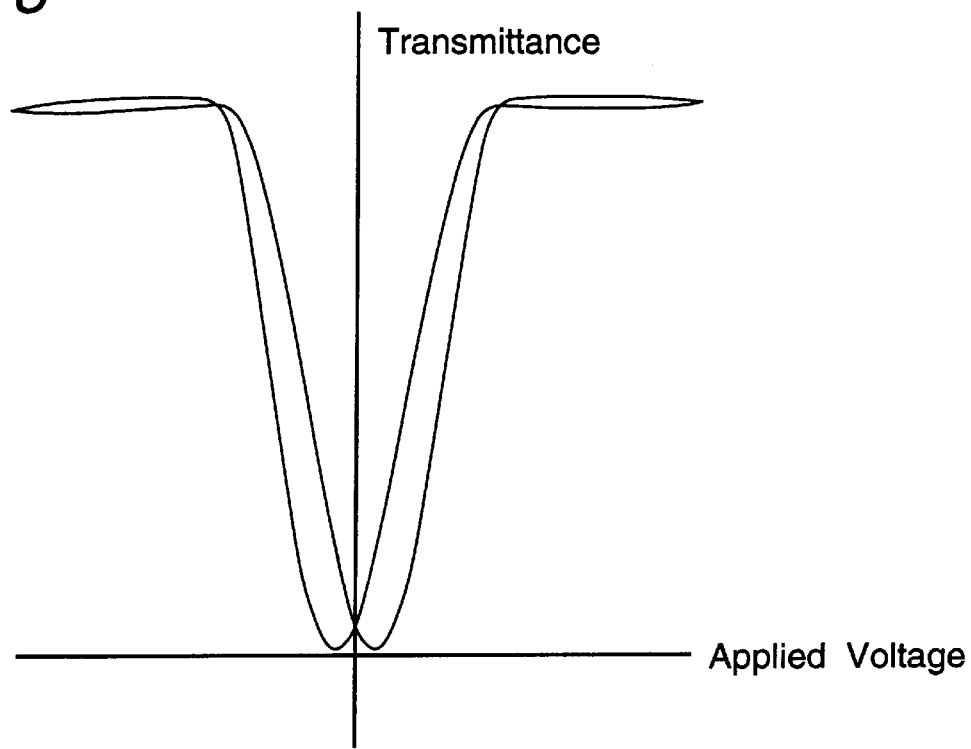
FIG. 3 is a graph showing an applied voltage-light transmittance relationship of the liquid crystal composition of the present invention prepared in Example 1.

The results are shown in FIG. 3. As can be seen from FIG. 3, a V-shaped hysteresis curve showing an applied voltage-light transmittance relationship was obtained from the liquid crystal composition 1. The light transmittance (transmitted light quantity) I$_{32}$ of the liquid crystal composition at the applied voltage V$_{32}$ of 2.4 V was 0.18. The cell was observed by a polarizing microscope with applying a voltage. As a result, it was confirmed that, by the application of voltage, the optic axes were uniformly changed over the whole field of view with the exception of fine defects.

Example 2

The following ferroelectric liquid crystal compound 3 and the following liquid crystal compound 4 capable of being in neither antiferroelectric phase nor ferroelectric phase were mixed in a mixing ratio shown in the following table to prepare a liquid crystal composition 2. The liquid crystal composition 2 was subjected to the same measurement as in Example 1.

As a result, a V-shaped hysteresis curve showing an applied voltage-light transmittance relationship was obtained, similarly to Example 1. The light transmittance (transmitted light quantity) I$_{32}$ of the liquid crystal composition at the applied voltage V$_{32}$ of 2.5 V was 0.23. The cell was observed by a polarizing microscope with applying a voltage. As a result, it was confirmed that, by the application of voltage, the optic axes were uniformly changed, similarly to Example 1.

Liquid crystal composition 2

| | Content | R$^1$ | m | Z | X | R$^2$ |
|---|---|---|---|---|---|---|
| Compound 3 | 90 wt % | C$_{12}$H$_{25}$— | 0 | —COO— | —CF$_3$ | —(CH$_2$)$_3$—O—C$_2$H$_5$ |
| Compound 4 | 10 wt % | C$_{10}$H$_{21}$— | 1 | —COO— | —H | —C$_4$H$_9$ |

Example 1

The following antiferroelectric liquid crystal compound 1 and the following antiferroelectric liquid crystal compound

Example 3

The following ferroelectric liquid crystal compound 5 and the following ferroelectric liquid crystal compound 6 were mixed in a mixing ratio shown in the following table to prepare a liquid crystal composition 3. The liquid crystal composition 3 was subjected to the same measurement as in Example 1.

As a result, a V-shaped hysteresis curve showing an applied voltage-light transmittance relationship was obtained, similarly to Example 1. The light transmittance (transmitted light quantity) $I_{32}$ of the liquid crystal composition at the applied voltage $V_{32}$ of 2.1 V was 0.18. The cell was observed by a polarizing microscope with applying a voltage. As a result, it was confirmed that, by the application of voltage, the optic axes were uniformly changed, similarly to Example 1.

to prepare a liquid crystal composition 5. The liquid crystal composition 5 was subjected to the same measurement as in Example 1.

As a result, a V-shaped hysteresis curve showing an applied voltage-light transmittance relationship was obtained, similarly to Example 1. The light transmittance (transmitted light quantity) $I_{32}$ of the liquid crystal composition at the applied voltage $V_{32}$ of 3 V was 0.08. The cell was observed by a polarizing microscope with applying a Liquid crystal composition 3

| | Content | $R^1$ | m | Z | X | $R^2$ |
|---|---|---|---|---|---|---|
| Compound 5 | 90 wt % | $C_{14}H_{29}-$ | 0 | $-COO-$ | $-CF_3$ | $-(CH_2)_3-O-C_2H_5$ |
| Compound 6 | 10 wt % | $C_{10}H_{21}-$ | 1 | $-COO-$ | $-CH_3$ | $-C_4H_9$ |

Example 4

The following antiferroelectric liquid crystal compound 7 and the following antiferroelectric liquid crystal compound 8 were mixed in a mixing ratio shown in the following table voltage. As a result, it was confirmed that, by the application of voltage, the optic axes were uniformly changed, similarly to Example 1.

Liquid crystal composition 5

| | Content | $R^1$ | m | Z | X | $R^2$ |
|---|---|---|---|---|---|---|
| Compound 7 | 25 wt % | $C_{10}H_{21}-$ | 1 | $-COO-$ | $-CF_3$ | $-(CH_2)_2-O-C_2H_5$ |
| Compound 9 | 75 wt % | $C_{10}H_{21}-$ | 1 | $-COO-$ | $-CF_3$ | $-(CH_2)_5-O-C_2H_5$ | to prepare a liquid crystal composition 4. The liquid crystal composition 4 was subjected to the same measurement as in Example 1.

As a result, a V-shaped hysteresis curve showing an applied voltage-light transmittance relationship was obtained, similarly to Example 1. The light transmittance (transmitted light quantity) $I_{32}$ of the liquid crystal composition at the applied voltage $V_{32}$ of 1.6 V was 0.11. The cell was observed by a polarizing microscope with applying a voltage. As a result, it was confirmed that, by the application of voltage, the optic axes were uniformly changed, similarly to Example 1.

Example 6

The following ferroelectric liquid crystal compound 10, the following antiferroelectric liquid crystal compound 11 and the following ferroelectric liquid crystal compound 12 were mixed in a mixing ratio shown in the following table to prepare a liquid crystal composition 6. The liquid crystal composition 6 was subjected to the same measurement as in Example 1.

As a result, a V-shaped hysteresis curve showing an applied voltage-light transmittance relationship was obtained, similarly to Example 1. The light transmittance Liquid crystal composition 4

| | Content | $R^1$ | m | Z | X | $R^2$ |
|---|---|---|---|---|---|---|
| Compound 7 | 25 wt % | $C_{10}H_{21}-$ | 1 | $-COO-$ | $-CF_3$ | $-(CH_2)_2-O-C_2H_5$ |
| Compound 8 | 75 wt % | $CH_3-O-(CH_2)_8-$ | 1 | $-COO-$ | $-CF_3$ | $-(CH_2)_5-O-C_2H_5$ |

Example 5

The following antiferroelectric liquid crystal compound 7 and the following antiferroelectric liquid crystal compound 9 were mixed in a mixing ratio shown in the following table (transmitted light quantity) $I_{32}$ of the liquid crystal composition at the applied voltage $V_{32}$ of 1.9 V was 0.21. The cell was observed by a polarizing microscope with applying a voltage. As a result, it was confirmed that, by the application of voltage, the optic axes were uniformly changed, similarly to Example 1.

| Liquid Crystal Composition 6 | | | | | | |
|---|---|---|---|---|---|---|
| | Content | R¹ | m | Z | X | R² |
| Compound 10 | 45 wt % | $C_{10}H_{21}$— | 1 | —$CH_2O$— | —$CF_3$ | —$(CH_2)_3$—O—$C_2H_5$ |
| Compound 11 | 30 wt % | $C_{11}H_{23}$— | 0 | —$CH_2O$— | —$CF_3$ | —$(CH_2)_2CH=CH_2$ |
| Compound 12 | 25 wt % | | | Structure; next formula | | |

Structure of the compound 12

$C_{10}H_{21}$—O—[ring]—H—COO—[ring]—COO—$CH(CF_3)$—$(CH_2)_3$—O—$C_2H_5$

Example 7

The following ferroelectric liquid crystal compound 10, the following antiferroelectric liquid crystal compound 13 and the ferroelectric liquid crystal compound 12 having the above-described structure were mixed in a mixing ratio shown in the following table to prepare a liquid crystal composition 7. The liquid crystal composition 7 was subjected to the same measurement as in Example 1.

As a result, a V-shaped hysteresis curve showing an applied voltage-light transmittance relationship was obtained, similarly to Example 1. The light transmittance (transmitted light quantity) $I_{32}$ of the liquid crystal composition at the applied voltage $V_{32}$ of 1.8 V was 0.20. The cell was observed by a polarizing microscope with applying a voltage. As a result, it was confirmed that, by the application of voltage, the optic axes were uniformly changed, similarly to Example 1.

| Liquid crystal composition 7 | | | | | | |
|---|---|---|---|---|---|---|
| | Content | R¹ | m | Z | X | R² |
| Compound 10 | 45 wt % | $C_{10}H_{21}$— | 1 | —$CH_2O$— | —$CF_3$ | —$(CH_2)_3$—O—$C_2H_5$ |
| Compound 12 | 30 wt % | | | Structure; above formula | | |
| Compound 13 | 25 wt % | $C_{11}H_{23}$— | 0 | —$CH_2O$— | —$CF_3$ | —$(CH_2)_2$—O—$CH_3$ |

Comparative Example 1

A liquid crystal composition I was prepared in the same manner as in Example 1, except that the following compound I (wherein the group $R^2$ has 6 carbon atoms) was used in place of the compound 2. The liquid crystal composition I was subjected to the same measurement as in Example 1.

Figure 4:
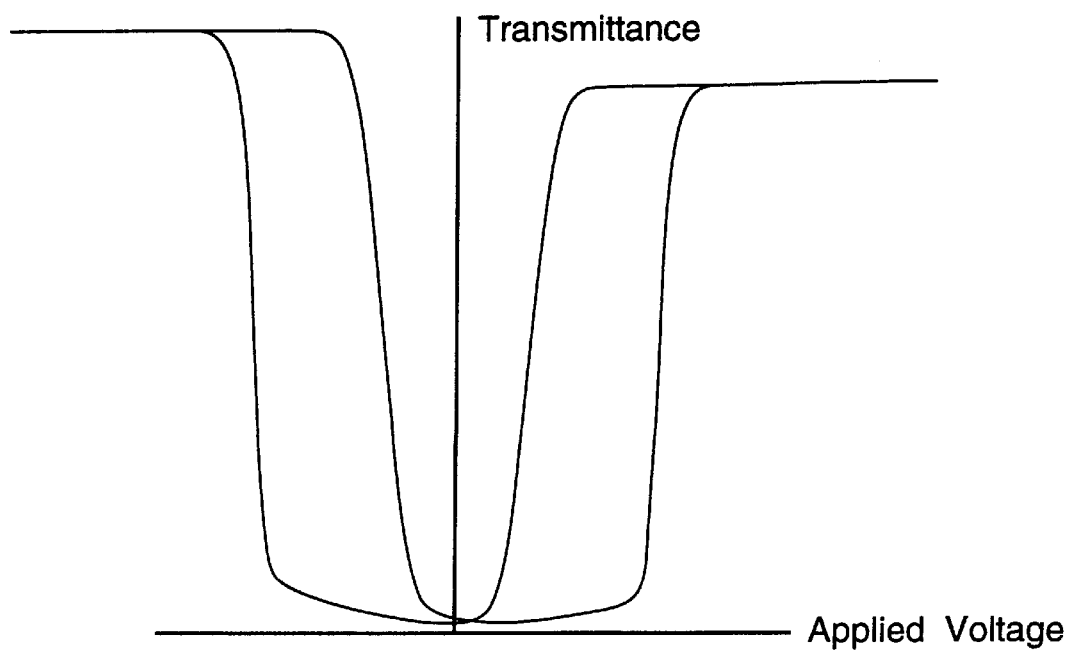
FIG. 4 is a graph showing an applied voltage-light transmittance relationship of the liquid crystal composition prepared in Comparative Example 1.

As a result, a double-hysteresis curve showing an applied voltage-light transmittance relationship, which had a threshold value, was obtained as shown in FIG. 4. The light transmittance (transmitted light quantity) $I_{32}$ of the liquid crystal composition at the applied voltage $V_{32}$ of 3.2 V was 0.01.

| Liquid Crystal Composition I | | | | | | |
|---|---|---|---|---|---|---|
| | Content | R¹ | m | Z | X | R² |
| Compound 1 | 25 wt % | $C_{11}H_{23}$— | 0 | —COO— | —$CF_3$ | —$(CH_2)_2$—CH=$CH_2$ |
| Compound I | 75 wt % | $C_{10}H_{21}$— | 0 | —COO— | —$CF_3$ | —$(CH_2)_5CH_3$ |

Comparative Example 2

A liquid crystal composition II was prepared in the same manner as in Example 4, except that the following compound II (wherein the group $R^2$ has 6 carbon atoms) was used in place of the compound 8. The liquid crystal composition II was subjected to the same measurement as in Example 4.

As a result, a double-hysteresis curve showing an applied voltage-light transmittance relationship, which had a threshold value, was obtained, similarly to Comparative Example 1. The light transmittance (transmitted light quantity) $I_{32}$ of the liquid crystal composition at the applied voltage $V_{32}$ of 5.2 V was 0.03.

| | Liquid crystal composition II | | | | |
|---|---|---|---|---|---|
| Content | $R^1$ | m | Z | X | $R^2$ |
| Compound 7  25 wt % | $C_{10}H_{21}$— | 1 | —COO— | —$CF_3$ | —$(CH_2)_2$—O—$C_2H_5$ |
| Compound II 75 wt % | $C_{10}H_{21}$— | 0 | —COO— | —$CF_3$ | —$(CH_2)_5$—$CH_3$ |

What is claimed is:

1. A thresholdless antiferroelectric liquid crystal composition which contains at least two compounds represented by the following formula (A) and each having different structures, wherein the amount of the at least two compounds is not less than 50% by weight based on the total amount of all liquid crystal compounds in the liquid crystal composition, and has a transmitted light quantity $I_{32}$ satisfying the following condition (II):

$$0.05 \leq I_{32} \leq 0.50 \quad (II)$$

said transmitted light quantity $I_{32}$ being determined by the method comprising arranging two transparent substrates, each of which has a transparent electrode and at least one of which has an orientation film, in such a manner that the transparent electrodes face each other with holding a gap having a width of 2 μm therebetween, to form a cell; filling the gap with the liquid crystal composition; orientating the liquid crystal composition; placing the cell between a polarizer and an analyzer in the crossed Nicols state so that the absorption axis of the polarizer agrees with the optic axis of the liquid crystal composition under application of no voltage; measuring light transmittance at the applied voltage to obtain a hysteresis curve showing an applied voltage-light transmittance relationship of the liquid crystal composition; and applying a voltage $V_{32}$ represented by the following formula (I) to the cell filled with the liquid crystal composition to measure the transmitted light quantity $I_{32}$;

$$V_{32} = 0.40 \times V_{80} \quad (I)$$

wherein $V_{80}$ is an applied voltage at which the transmitted light quantity of the liquid crystal composition becomes 0.8 in the hysteresis curve in which the transmitted light quantity given when no voltage is applied is 0 and the maximum transmitted light quantity is 1;

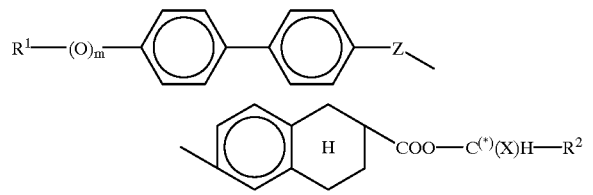

(A)

wherein $R^1$ is an alkyl group of 2 to 20 carbon atoms, in which one or more hydrogen atoms may be substituted with halogen atoms, one or more methylene group in the alkylene group $R_1$ may be substituted with —O— groups, with the proviso that, when one or more of the methylene groups and/or the halomethylene groups are substituted with —O— groups, the plural —O— groups are not adjacent to each other;

m is 0 or 1;

Z is a —COO— group or a —$CH_2O$— group;

X is a hydrogen atom, a methyl group or a trifluoromethyl group; and $R^2$ is a group selected from the group consisting of a straight-chain alkyl group of 1 to 5 carbon atoms, an ether group represented by —$(CH_2)_p$—O—$(CH_2)_q CH_3$, p is an integer of 1 to 6, and q is 0 or an integer of 1 to 3, and an alkene group wherein a terminal ethyl group constituting a straight-chain alkyl group of 2 to 5 carbon atoms is replaced with a group having a C=C double bond, and wherein $R^2$ in the formula (A) of one of the two or more compounds (A) is an ether group represented by —$(CH_2)_p$—O—$(CH_2)_q CH_3$ wherein p is 2 or 5 and q is 0 or an integer of 1 to 3.

2. The liquid crystal composition as claimed in claim 1, wherein the compounds of the formula (A) include a compound where $R^2$ is an alkyl group of 4 to 5 carbon atoms in the amount of not more than 30% by weight based on 100% by weight of the liquid crystal composition.

3. The liquid crystal composition as claimed in claim 1 or claim 2, wherein at least one compound selected from among the two or more compounds represented by the formula (A) is a compound wherein $R^2$ is not a straight-chain alkyl group.

4. The liquid crystal composition as claimed in claim 1 or claim 2, wherein the hysteresis curve showing an applied voltage-light transmittance relationship of the liquid crystal composition is V-shaped, said hysteresis curve being obtained by measuring light transmittance at the applied voltage by the method comprising arranging two transparent substrates, each of which has a transparent electrode and at least one of which has an orientation film, in such a manner that the transparent electrodes face each other with holding a gap having a width of 2 μm therebetween; filling the gap with the liquid crystal composition to prepare a liquid crystal-containing cell in which the liquid crystal composition is orientated so that the optic axes of the liquid crystal composition are uniformly changed according to the voltage applied between the transparent electrodes; and placing the liquid crystal-containing cell between a polarizer and an analyzer in the crossed Nichols state so that the absorption axis of the polarizer agrees with the optic axis of the liquid crystal composition under application of no voltage; and applying a voltage to measure the light transmittance.

5. The liquid crystal composition as claimed in claim 1 or claim 2, wherein at least one compound selected from among the two or more compounds of the formula (A) forming the liquid crystal composition is a compound wherein X in the formula (A) is trifluoromethyl group; and a compound wherein X in the formula (A) is a hydrogen atom, an alkyl group or a fluoroalkyl group, with the proviso that, when $R^2$ in the formula (A) is an alkyl group of 1 to 5 carbon atoms, said X is a hydrogen atom or an alkyl group.

* * * * *